United States Patent [19]
Wyatt et al.

[11] Patent Number: 5,691,528
[45] Date of Patent: *Nov. 25, 1997

[54] SCANNING SYSTEM FOR EITHER HAND-HELD OR STATIONARY OPERATION FOR READING 1-D OR 2-D BARCODES

[75] Inventors: Peter Wyatt, Portland, Oreg.; Raj Bridgelall, Mount Sinai, N.Y.; Joseph Katz, Stony Brook, N.Y.; David Goren, Ronkonkoma, N.Y.; Philip Swift, Port Jefferson, N.Y.

[73] Assignee: Symbol Technologies Inc., Holtsville, N.Y.

[*] Notice: The term of this patent shall not extend beyond the expiration date of Pat. No. 5,504,316.

[21] Appl. No.: 377,732

[22] Filed: Jan. 25, 1995

Related U.S. Application Data

[63] Continuation-in-part of Ser. No. 153,053, Nov. 17, 1993, Pat. No. 5,504,316, Ser. No. 981,448, Nov. 25, 1992, Pat. No. 5,478,997, Ser. No. 28,107, Mar. 8, 1993, Pat. No. 5,408,081, Ser. No. 108,521, Jul. 19, 1993, abandoned, and Ser. No. 37,143, Mar. 25, 1993, abandoned, which is a division of Ser. No. 715,267, Jun. 14, 1991, Pat. No. 5,235,167, said Ser. No. 108,521, is a division of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ .................................................. G06K 7/10
[52] U.S. Cl. ........................................ 235/462; 235/472
[58] Field of Search ................................... 235/462, 472

[56] References Cited

U.S. PATENT DOCUMENTS

| | | |
|---|---|---|
| 4,251,798 | 2/1981 | Swartz et al. . |
| 4,360,798 | 11/1982 | Swartz et al. . |
| 4,369,361 | 1/1983 | Swartz et al. . |
| 4,387,297 | 6/1983 | Swartz et al. . |
| 4,409,470 | 10/1983 | Shepard et al. . |
| 4,460,120 | 7/1984 | Shepard et al. . |
| 4,794,239 | 12/1988 | Allais . |
| 4,853,521 | 8/1989 | Claeys et al. ............... 235/462 |
| 5,019,694 | 5/1991 | Collins, Jr. ................. 235/462 |
| 5,105,070 | 4/1992 | Wike, Jr. et al. .......... 235/467 |
| 5,140,141 | 8/1992 | Inagaki et al. ............ 235/462 |
| 5,155,346 | 10/1992 | Doing et al. .............. 235/462 |
| 5,168,149 | 12/1992 | Dvorkis et al. . |
| 5,235,167 | 8/1993 | Dvorkis et al. . |
| 5,280,165 | 1/1994 | Dvorkis et al. . |
| 5,340,973 | 8/1994 | Knowles et al. .......... 235/472 |
| 5,504,316 | 4/1996 | Bridgelall et al. ........ 235/462 |

FOREIGN PATENT DOCUMENTS

| | | | |
|---|---|---|---|
| 425274 | 5/1991 | European Pat. Off. ........... 235/462 |
| 6-103395 | 4/1994 | Japan .............................. 235/472 |

*Primary Examiner*—Donald T. Hajec
*Assistant Examiner*—Karl Frech

[57] ABSTRACT

Optical scanning of one and two-dimensional barcode symbols is carried out using a variety of ergonomic scanner embodiments which can each be used either in a hand-held mode or in a fixed-mode. In certain embodiments, hand-held scanners are described which can if required be easily positioned in a number of desired orientations on a work surface. Other embodiments disclose point-of-sale arrangements incorporating removable barcode scanners that can, where necessary, be removed from the point-of-sale unit and used by the checkout operator to scan a large or bulky item in a "point-and-shoot" mode.

35 Claims, 12 Drawing Sheets

SCANNING SYSTEM FOR EITHER HAND-HELD OR STATIONARY OPERATION FOR READING 1-D OR 2-D BARCODES

REFERENCE TO RELATED APPLICATIONS

This application is a Continuation-in-Part of Ser. No. 08/153,053, filed Nov. 17, 1993, now U.S. Pat. No. 5,504,316.

This application is also a Continuation-in-Part of U.S. application Ser. No. 08/108,521, filed Jul. 19, 1993, now abandoned which is a division of application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149, which is a Continuation-in-Part of application Ser. No. 07/428,770, filed Oct. 30, 1989, now U.S. Pat. No. 5,099,110.

This application is also a Continuation-in-Part of U.S. patent application Ser. No. 08/037,143, filed Mar. 25, 1993, now abandoned which is a division of application Ser. No. 07/715,267, filed Jun. 14, 1991, now U.S. Pat. No. 5,235,167.

This application is also a Continuation-in-Part of Ser. No. 07/981,448, filed Nov. 25, 1992, now U.S. Pat. No. 5,478,997.

This application is further a Continuation-in-Part of Ser. No. 08/028,107, filed Mar. 8, 1993, now U.S. Pat. No. 5,408,081.

TECHNICAL FIELD

The invention also relates to scanners operable in both portable (hand-held) and surface mounted (hands-free) modes for reading various types of indicia. The invention further relates to novel miniature assemblies capable of 1-D and 2-D scanning. The invention relates in some embodiments to combined hand-held and hands-free scanning systems which "read" indicia, such as barcode symbols, and in particular to systems and methods for scanning one-dimensional (1-D) and two-dimensional (2-D) barcode symbols with a first scan pattern that is relatively small and dense so as to be visible to the user, and thereafter a second, larger and more robust scan pattern for decoding.

BACKGROUND ART

Various optical readers and scanning systems have been developed for reading barcode symbols appearing on a label or the surface of an article. The barcode symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alpha-numerical characters intended to be descriptive of the article or some characteristic of it. Such characters typically are represented in digital form, and utilized as an input to a data processing system for applications in point-of-sale processing, inventory control and the like. Scanning systems of this general type have been disclosed, for example, in U.S. Pat. Nos. 4,251,798; 4,360,798; 4,369,361; 4,387,297; 4,409,470 and 4,460,120, all assigned to the assignee of the present invention.

One embodiment of such a scanning system, as disclosed in some of the above patents, resides in, inter alia, a hand-held, portable laser scanning head supported by a user. The scanning head is configured to enable the user to aim the head at a target to emit a light beam toward a symbol to be read. The light source is a laser scanner typically in the form of a gas or semiconductor laser element. Use of semiconductor devices as the light source in scanning systems is particularly desirable because of the small size, low cost and low power requirements of semiconductor lasers. The laser beam is optically modified, typically by a lens, to form a beam spot of a certain size at the target distance. Preferably, the beam spot size at the target distance is approximately the same as the minimum width between regions of different light reflectivity, i.e., the bars and spaces of the symbol.

The barcode symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements are concatenated together to form the complete barcode symbol, with each character of the message being represented by its own corresponding group of elements. In some symbologies a unique "start" and "stop" character is used to-indicate where the barcode begins and ends. A number of different barcode symbologies exist. These symbologies include UPC/EAN, Code 39, Code 128, Codebar and Interleaved 2 or 5.

In order to increase the amount of data that can be represented or stored on a given amount of surface area, several new barcode symbologies have recently been developed. One of these new code standards, Code introduces a "two-dimensional" concept by stacking rows of characters vertically instead of extending the bars horizontally. That is, there are several rows of bar and space patterns, instead of one row. The structure of Code 49 is described in U.S. Pat. No. 4,794,239, which is hereby incorporated by reference.

A one-dimensional single-line scan, as ordinarily provided by hand-held readers, functions by repetitively scanning the light beam in a line or series of lines across the symbol using a scanning component such as a mirror disposed in the light path. The scanning component may either sweep the beam spot across the symbol and trace a scan line across and past the symbol, or scan the field in view of the scanner, or do both.

Scanning systems also include a sensor or photodetector, usually of semiconductor type, which functions to detect light reflected from the symbol. The photo-detector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alpha-numeric characters so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

More sophisticated scanning, described in U.S. Pat. No. 5,235,167, assigned to the common assignee, and incorporated herein by reference, carries out selective scanning of 1-D and 2-D barcodes. Preliminary information, such as the barcode type and size, is preliminarily decoded during an aiming mode of operation when a relatively narrow and visible raster pattern is impinged on the target. Based upon the preliminary information, received by the scanner in the form of light reflected from the target, converted to an electrical signal and decoded, an appropriately sized raster scan pattern is generated. If the barcode pattern is found to be skewed or misaligned with respect to the direction of the raster scanning pattern, the pattern is generated with an orientation in alignment with the barcode.

Aligning the scan pattern to the barcode is awkward, especially for long range scanning. If a barcode is not horizontally positioned on, for example, a container, the user is forced to position the scanner sideways in order to scan the barcode. One possible solution, described in the aforementioned U.S. Pat. No. 5,235,167, is to control the scanner to self-orient the scan pattern to the orientation of the barcode.

Scanning 2-D, or PDF, barcodes with a raster pattern also presents a similar problem. At certain distances, the visibility of a 2-D raster pattern is poorer than that of a single line, and orienting the barcode with the scan lines is not effortless. Assuming the pattern to be amply visible, the user may tend to position the 2-D barcode horizontally under a scan lamp. However, it would be ideal if no aligning is required. For example, a 2-D barcode may have been a photocopy vertically aligned onto a page. Upon scanning, the user may first subconsciously attempt to present the page horizontally, and thus present the barcode vertically. Without ability by the scanner to instantaneously sense barcode orientation, and then position a raster pattern to scan it, the user will be forced to realign the page vertically.

Following alignment of the scan pattern to the barcode, the pattern is then increased in width so as to fully span the length of the barcode, and if the pattern is determined to be a 2-D barcode, the height of the scan pattern is also increased so as to decode all of the barcode rows. However, the rate at which the raster pattern is increased in size is fixed and independent of the size of the barcode or the distance between the hand-held scanner and target. At a common rate of pattern size increase, depending upon the size of the barcode it may require from 0.1 to 2.0 seconds to open the scan pattern and decode the barcode. Distance to the target is another factor. Pattern size is incremented until the entire pattern is decoded. The size of each increment of increase is determined in part by the working range of the scanner. Very long range scanners, usable up to sixty feet, for example, may require smaller increments so that the patterns do not grow too fast at the end of a working range where much of the information, including start and stop codes, concerning attributes of the barcode resides. Hence, it would be desirable to control the rate at which the scan pattern grows to decode the barcode depending upon the characteristics of the barcode itself.

The scanner unit must be compact, energy efficient, and capable of scanning both 1-D and 2-D barcodes. The scan pattern will preferably be optimized in accordance with whether the unit is in hand held or surface supported (hands-free) modes of operation, whether it is in a presentation type of operation (wherein the indicia are passed under a scan lamp) or a pass through type of operation (supermarket type) and on the type of barcode or other indicia to be read.

DISCLOSURE OF THE INVENTION

It is a general object of the present invention to advance the state-of-the-art of scanners which are usable both in surface mounted (hands-free) operation and also in hand-held (portable) operation. The applicants propose a variety of embodiments which are not only relatively easy to manufacture, but which are easy to use and, very importantly, aesthetically pleasing.

A subsidiary object of this invention is to improve aim and shoot capabilities of such two-mode barcode scanners. A more particular object is to improve the scan pattern visibility of barcode scanners during aiming. Another object of the invention is to implement robust scan patterns during decoding, and another is to enable the scanner to automatically orient the scan pattern to the rotational orientation of the symbol. A further object is to transition between aiming and decoding automatically while reading 1-D or 2-D barcodes. Yet a further object is to provide convertibility between hand-held and surface mount applications while automatically generating scan patterns optimized for the particular application and type of indicia being read.

These and other objects and features of the invention are satisfied, at least in part, according to a first aspect of the invention, by an optical scanner for reading indicia comprising a scanner body having a manually graspable handle portion and a head portion, the head portion having a window therein;

means for producing a scanning light beam and for directing the light beam out of the window to impinge on an indicia to be read;

an adjustable base pivotally secured to the handle portion, the base having first and second support surfaces whereby the scanner is arranged to be operated in a first hands-free orientation, standing on the first support surface, and in a second hands-free Orientation standing on the second support surface.

According to a second aspect of the invention there is provided an optical scanner for reading indicia comprising a scanner body having a manually graspable handle portion and a head portion, the head portion having a window therein;

means for producing a scanning light beam and for directing the light beam out of the window to impinge on an indicia to be read;

the head portion comprising a curved panel having upper, lower and side edges, and the handle portion being mounted behind the panel, on a side opposite the window.

According to a third aspect of the present invention there is provided a point-of-sale unit comprising a fixed base unit and optical scanner for reading indicia, the scanner being arranged in a first mode for attachment to the base unit for hands-free operation; and in a second mode for removal from the base unit for portable operation unattached to the base unit.

Preferably, the system includes means for determining whether operation is in a fixed or portable mode, and means for adapting the scan pattern to an optimized pattern for such mode of operation. Preferably, the scan pattern is also optimized in dependency on the type of indicia being read and whether scanning is carried out in a presentation type (under a scan lamp) or a pass through (supermarket) type reader.

In accordance with a preferred embodiment, a light beam scanner generates a light beam directed toward a symbol to be read and moves the beam along the symbol in an omnidirectional scanning pattern, that is, one wherein the pattern trajectory is not limited to one or a limited number of directions while a symbol is traversed. A light detector receives reflected light from the symbol and generates electrical signals responsive to the reflected light, and the scanning pattern is controlled in response to the electric signals. The scanning pattern may be radially symmetric, a rotating line pattern, or a spiral pattern. The pattern control may vary the diameter or trajectory of .the light beam, and more particularly may move the light beam selectively along a first scan path or a second scan path depending on the electrical signals. In preferred embodiments, the first and second scan paths differ from each other by rotation about an axis of rotation, by an increase in scan path envelope diameter, by rotation of the first scan path about an axis of rotation of the first scan path about an axis of rotation of the first scan path about an axis of rotation and increase of scan path envelope diameter, or by displacement of the center of rotation of the first scan pattern. Preferably, the scan pattern is such that the bar code is traversed by at least two scan lines per row of bar patterns during reading.

A particular embodiment of the foregoing includes providing a relatively bright, rosette scanning pattern for enabling a user to aim and direct the beam toward a bar code symbol to be read, scanning the symbol, detecting light reflected from the symbol and generating an electrical signal in response to the reflected light, and modifying the radial diameter of the scan pattern in response to the electrical signal.

Another aspect of the invention provides a light source for generating a light beam directed toward a symbol to be read, and a light detector for receiving light reflected from the symbol and, in response, generating an electrical signal. This signal is converted to data corresponding to a content of the symbol. The light beam is controlled to scan the symbol with a prescribed scan pattern to develop first data, and thereafter increase a dimension of the scan pattern at a rate dependent upon that first data.

Preferably, the scan pattern is increased in dimension at a rate, and to a magnitude, that are determined by the decoded signal, to produce ultimate data corresponding to the symbol.

In accordance with a preferred embodiment, the light beam is controlled to scan a symbol in an aim mode of operation and thereafter in a decode mode. The decode mode may follow the aim mode in response to a second manual operation of a trigger, or may occur automatically. In the aim mode, the light beam scans the symbol with a first, relatively small prescribed scan pattern that is visible to the user and covers only a portion of the symbol. The decode mode of operation scans a portion of the symbol with a second (same or different) prescribed scan pattern, and then inclemently increases the size of this second pattern while decoding. Scan patterns found useful for aiming and decoding are spiral, stationary or rotating Lissajous, rotating line and rosette, with the spiral producing the most visible aim pattern and the rotating Lissajous producing the most robust decoding. A stationary or precessing raster pattern is produced for 2-D barcode scanning and decoding.

Although the scan patterns for aiming and decoding may be the same, they preferably are different. In this respect, the symbol is preliminarily analyzed using a rotating Lissajous pattern during the aim mode of operation to determine whether the symbol is one-dimensional or two-dimensional, and, in accordance with another aspect of the invention, the light beam is automatically controlled to describe a stationary or precessing raster scan pattern for decoding if the symbol is two-dimensional. If the scanned symbol is determined to be a one-dimensional symbol, the pattern for aiming and decoding both preferably are a rotating Lissajous. A scan control circuit automatically transitions between the aiming and decoding patterns, such as from Lissajous to raster for 2-D scanning.

In accordance with a further aspect of the invention, the scanner is incorporated within a housing including an approximately square window for enabling the light beam to pass through it. The housing is adapted to be hand-held, and releasably attached to a surface mount base. In a preferred embodiment, the surface mount base enables the housing to rotate about vertical and horizontal axes, and optionally includes a vertical extension to increase the height of the scanner.

Yet another aspect of this invention concerns decoding a barcode that is angularly offset from the horizontal, without prior knowledge by the user, and despite any droop in the scan lines emitted the scanner that is characteristic of some 2-D scanning mechanisms. Advantageously, the light beam is controlled to traverse the symbol with a scan pattern having the form of a raster that precesses among successive frames so as to align with rows of barcode oriented at various angles.

A further aspect of the invention provides system for reading coded indicia, comprising an electro-optical reader with a portable housing having a means for enabling a human operator to hold and aim the reader at indicia to be read. The reader includes a light source for generating a light beam, a light detector for receiving light reflected from the indicia and responsively generating an electrical signal, and means for converting the electrical signal to data representing information content of the indicia. A stationary fixture (e.g. a point-of-sale) has a means for supporting the portable housing of the reader when not held by the operator. A scan control means controls the light beam to scan the indicia with different prescribed scan patterns in response to the information content of the indicia and whether the portable housing is separated from or mounted in the fixture.

When the reader is enabled, the scan means controls the light beam to preliminary scan the indicia with a scan pattern, such as a rotating Lissajous, that indexes angularly so as to traverse the indicia along different directions progressively as a function of time. Assume first that the housing is separated from the fixture. When the indicia content corresponds to a 1-D barcode pattern, as determined during preliminary scanning the scan pattern for decoding continues as a rotating Lissajous pattern, in accordance with the preferred embodiment. When the indicia content corresponds to a 2-D barcode pattern, the scan pattern preferably changes to a precessing raster pattern.

If the housing is mounted in the fixture, and the indicia content corresponds to a 1-D barcode pattern, as determined during preliminary scanning the scan pattern for decoding may be a single line or multiple line scan pattern. If the indicia content corresponds to a 2-D barcode pattern, the scan pattern may be a raster pattern. In either case, the scan pattern for decoding is optimized to read the classification of barcode preliminary scanned.

A particularly advantageous "aim and shoot" operation of the scanner, in accordance with the invention, is as follows. The operation comprises first directing a light beam toward a symbol to be read, executing an aim mode of operation by controlling the light beam to scan the symbol with a visible scan pattern in the form of a rotating Lissajous pattern, and then receiving light reflected from the symbol and producing first data identifying an attribute of the symbol including whether the symbol represents a one-dimensional or two-dimensional barcode symbol. The operation then provides executing a decode mode such that (a) if during aiming, the symbol is determined to be a one-dimensional barcode symbol, decoding while scanning using a rotating Lissajous scan pattern to scan the symbol, and (b) if the symbol is determined to be a two-dimensional barcode symbol, decoding while using a raster scan pattern to scan the symbol.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

As used in this specification, the terms "symbol" and "barcode" are intended to be broadly construed and to cover not only patterns composed of alternating bars and spaces of various widths, but also other one or two dimensional graphic patterns, as well as alphanumeric characters.

The invention provides a scanner system in which the scan pattern produced by a light beam is controlled to describe an omnidirectional scanning pattern, light reflected from a symbol is detected, and the scan pattern is therefore controlled in response to the detected signals. The invention also provides a scanner system and method in which adjustment of the spatial coverage of the scan pattern of a scanning beam is automatically made at a responsively controlled rate to effect an appropriate-type of scanning pattern depending upon the type of symbols to be read. The invention further provides a scanning system operation in which two different types of barcodes may be read, a standard linear barcode and a 2-D barcode. The invention provides a technique for determining the type of barcode, its angular orientation, and adjusts the spatial coverage or vertical sweep of the raster scanning beam to fully scan and read a 2-D barcode.

In accordance with a first aspect of the invention, the invention further produces scan patterns for reading indicia, optimized in dependence upon the operating mode of the scanner (portable or fixed) and other criteria. A portion of the barcode is initially scanned by projecting alight beam on the target containing the barcode, and scanning the beam using a pattern that is relatively small and dense so as to be visible to the user for aiming. A portion of the barcode is partially decoded to determine the type, and possible size, of the barcode, whether it is a 1-D or 2-D barcode and its angular orientation. A rotating Lissajous pattern is preferred for this purpose as it has been determined to be most robust, although other patterns can be used. If the symbol is found to be a 1-D barcode, the scan pattern is increased in size (opened) to a maximum size, at a prescribed rate, in conformance with the portion of the symbol previously decoded, and the rotating Lissajous pattern decodes the entire symbol. If the symbol is determined to be a 2-D barcode, the rotating Lissajous pattern is converted to a raster pattern, and increased in size at a prescribed rate to decode the barcode. In a preferred embodiment, the raster pattern precesses so as to align with the 2-D symbol and therefore read 2-D barcodes of different angular orientations with respect to the horizontal scanning pattern.

Figure 1:
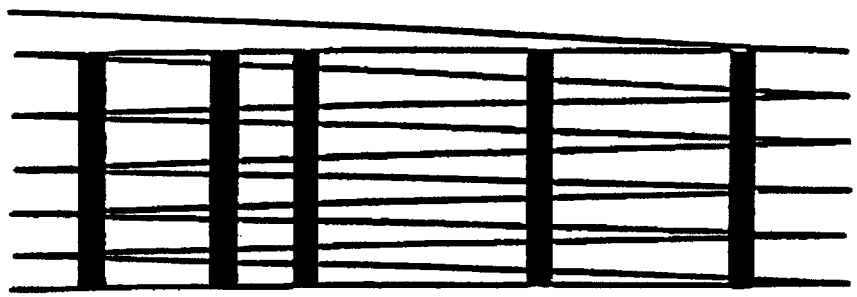
FIG. 1 shows raster scanning of a 1-D barcode pattern.
Figure 2:
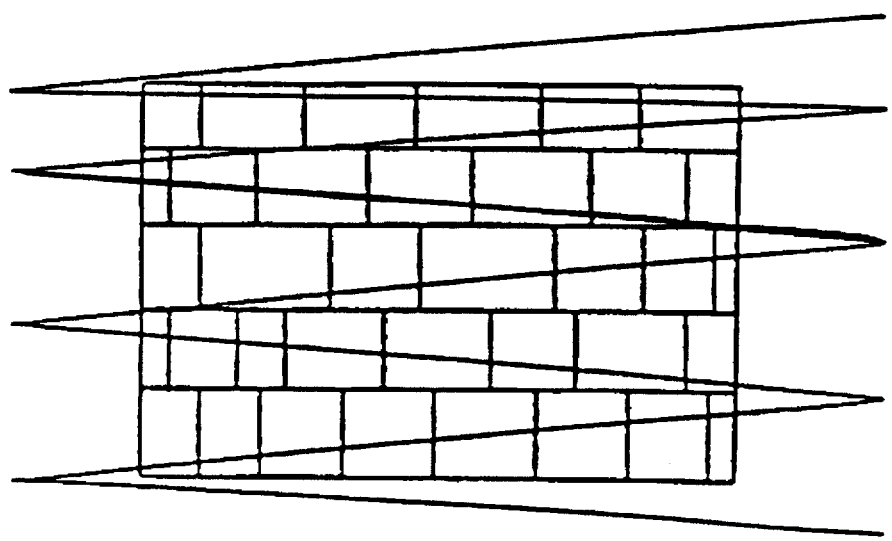
FIG. 2 shows scanning of a 2-D, or PDF, barcode pattern.

Referring to FIG. 1, a raster scanning pattern, known in the art, is illustrated as traversing a 1-D barcode. Such a scan pattern may be generated by vertical (or Y-direction) displacement of a linear scan line driven in the X-direction, such as described in U.S. Pat. No. 4,387,297. Although numerous scan lines traverse the barcode, only one line of scan is necessary for proper decoding since the additional scan lines are redundant and only re-read the same data on a different vertical position of the barcode symbol. In FIG. 2, the raster traverses a 2-D barcode, and is opened vertically to encompass the barcode entirely. Although the 2-D pattern contains many rows of optical elements, it is necessary only that each row be traversed once, as shown, for decoding.

Figure 3A:
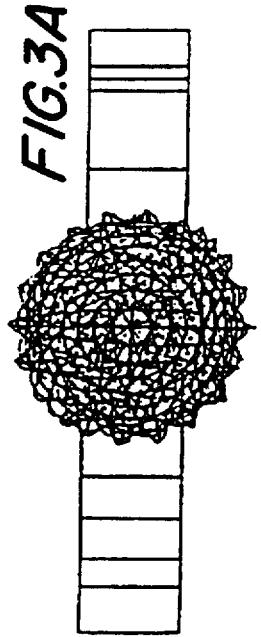
FIG. 3A shows a relatively small pattern in scanning a portion of a 1-D barcode for aiming.
Figure 5A:
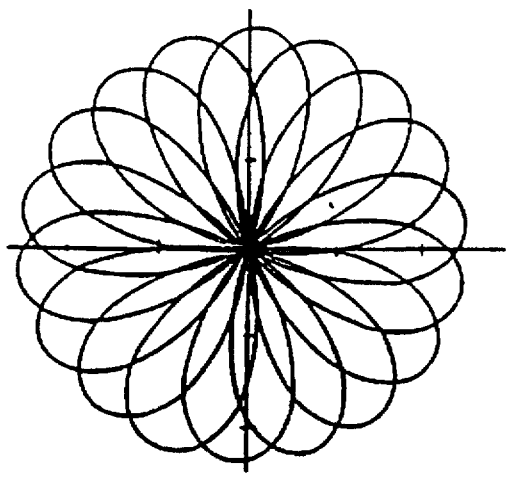
FIGS. 5A and 5B show rosette patterns of different density for aiming.
Figure 5B:
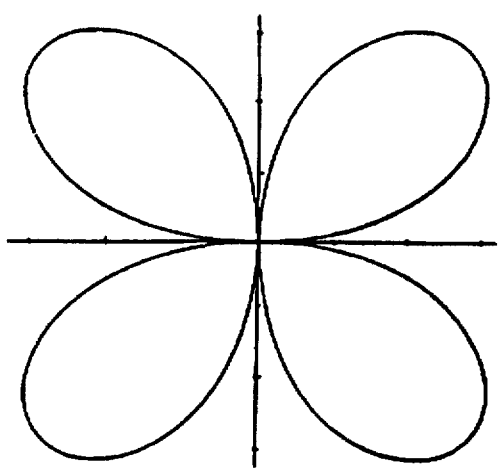
Figure 5C:
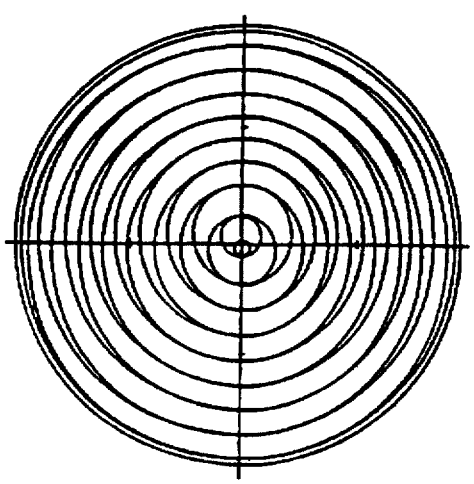
FIG. 5C shows a spiral pattern and FIG. 5D shows a stationary Lissajous pattern.
Figure 5D:
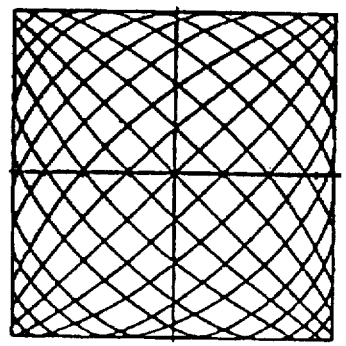

For long range scanning, first aiming and then scanning the barcode to read the code are natural. These operations are termed the "aim mode" and "decode mode" hereinafter. Two trigger pull positions are normally provided, or the trigger is pulled twice to produce these respective modes of operation. In accordance with one aspect of the invention, and referring to FIGS. 3A and 3B, upon a first pull of the trigger a bright spot for aiming is used to establish a small visible pattern on the target surface. This technique is similar to that disclosed in U.S. Pat. No. 5,117,098 of Swartz and assigned to the assignee of this invention. This visible pattern may be produced by a small scan line, but preferably is presented in the form of a bright spot. This "spot" can be developed, and is presented in most visible form, by oscillating circle, or spiral, pattern shown in FIG. 5C. Other patterns found suitable for aiming are rosette (FIGS. 5A and 5B), stationary Lissajous (FIG. 5D), rotating line (FIG. 5E) and rotating Lissajous (FIG. 6).

Figure 5E:
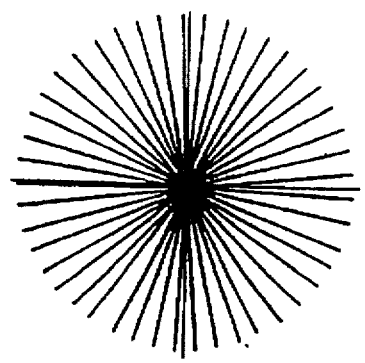
FIG. 5E shows a rotating line pattern for aiming with automatic scan alignment.
Figure 6:
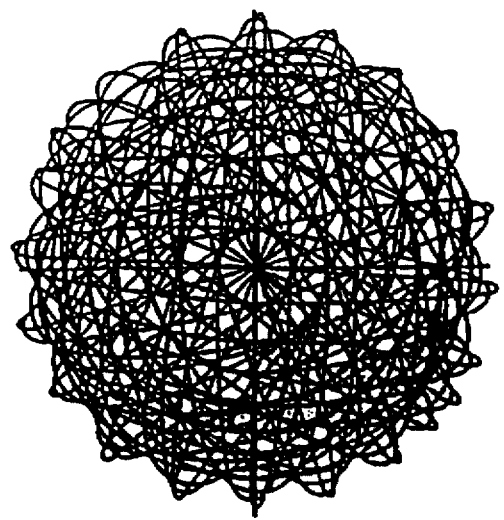
FIG. 6 shows a rotating Lissajous pattern for aiming on and decoding 1-D barcodes.

For example, the line scan pattern of FIG. 5E is produced by generating a beam of relatively short line scan pattern, and rotating the pattern quickly about its center once or after every few scans. Alternatively, the scan line may be randomly positioned at pre-determined angles, once or after every few scans, and the angle of rotation about its center of rotation may be controlled in response to signals read produced by light reflected from the symbol. Assuming that the spot is located in nearly the center of the barcode, the orientation of the barcode may be estimated using a peak detector, to be described later, if the barcode is a 1-D barcode or the orientation may be estimated from the returned digital bar pattern, or DBP, as the scan line is positioned at different angles.

Figure 3B:
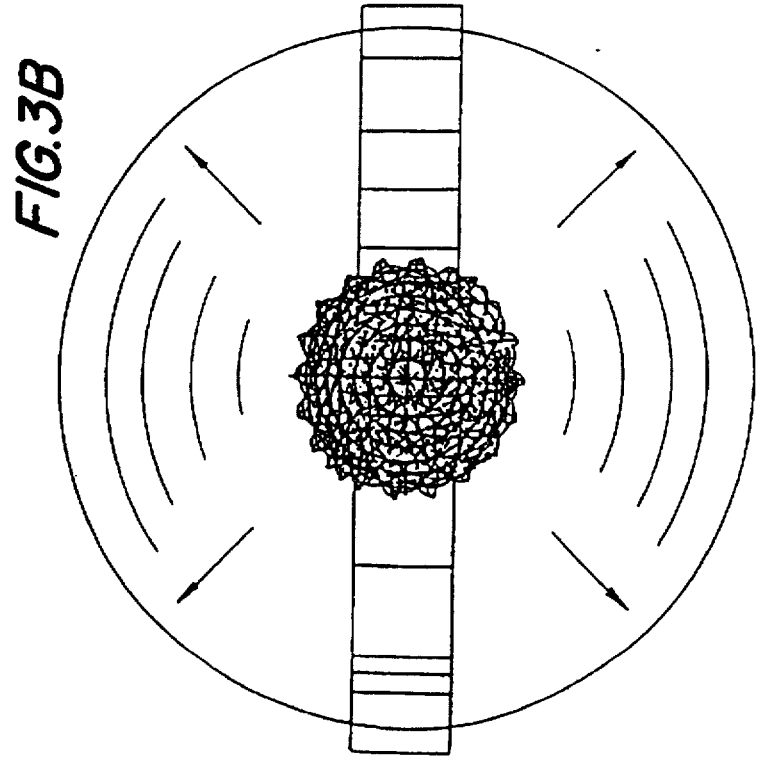
FIG. 3B depicts expansion of the scan pattern to decode the entire barcode.

Upon the second trigger pull (or further pull of the trigger in the same stroke if the trigger is multipurpose); or automatically, in the decode mode of operation, the scan pattern opens in the exact orientation of the barcode as determined by the peak detector, as shown in FIG. 3B, so that the entire barcode will be decoded. The ultimate size of the rotating scan line pattern, and the rate at which the pattern opens, is controlled dependent upon barcode attributes, such as type, aspect ratio and size, decoded during the aim mode. Optionally, the barcode may be completely decoded during the aim mode, and if so, a consistency check may be performed during the decoding mode.

The following example assumes an aim pattern in the form of a single scan line, FIG. 5E, a pattern particularly useful for discerning the orientation of a barcode prior to decoding. In order to rotate a single scan line, or position if at any given angle, an element having two degrees of freedom with equal resonant frequencies on both axes is necessary. The horizontal and vertical oscillations are given by $$\dot{X}(t) = \sin(wt) \cos(\theta)$$

$$\dot{Y}(t) = \sin(wt) \sin(\theta)$$

where θ is the angle of rotation with respect to the x-axis. This angle will normally be produced in the form of a digital quantity presented to the rotation system via a microprocessor system. The resonant frequency w should be chosen high enough so that a possible loss in aggressiveness during the angle estimation/aiming period is not apparent.

In order to cover all possible orientations of the barcode, the scan lines must be capable of rotating through 180 degrees, and preferably the entire symbol will be covered such that a least two scan lines traverse each row of bar patterns during reading. However, the resolution of rotation depends on the aspect ratio and size of the barcode.

If it is necessary to rotate the scan line once every s scans, at a resolution of r degrees, for a duration of d seconds in order to cover a total of 180 degrees, then $$w = 180 \, \pi s/rd$$

is selected.

For example, if a complete 180 degree rotation should be accomplished within 0.1 second, at 10 degree resolution for every scan, then w/2π=90 Hz will suffice.

Figure 8:
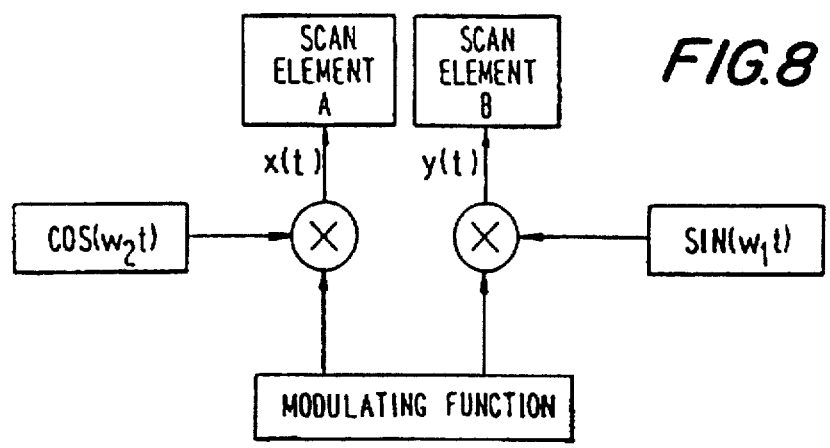
FIG. 8 is a simplified block diagram of circuitry for producing aim and rotating line scan patterns.

Although the short single line pattern is the most visible, it is disadvantageous for aiming because it suggests orientation and may be psychologically distracting. Larger spots, those shown in FIG. 5A–D, can be simulated without changing the aperture by creating the spiral pattern shown in FIG. 5A, implemented by modulating the size of a circle pattern. As mentioned previously, a spiral is the most visible, non-orientation, suggestive and easily implemented. All of the aim patterns of FIG. 5A–D can be created by the circuit shown symbolically in FIG. 8, which implements the following equations:

$$x(t) = \sin(w_2 t) A(t) \qquad (1)$$

$$y(t) = \cos(w_1 t) A(t) \qquad (2)$$

The function A(t) can be arbitrarily picked. For example, let A(t)=sing(w₃t). The rosette pattern FIG. 5A is created with $w_1=w_2$, and $w_3=4w_2$; the rosette pattern of FIG. 5B is created with $w_1=w_2$, and $w_3=2w_2$; the spiral pattern of FIG. 5C is created with $w_1=w_2$, and A(t)=|sin(w₃/50)|; and the stationary Lissajous pattern of FIG. 5D is created with $w_1=w_2/1.1$, and A(t)=1. The rotating line pattern, FIG. 5E, is created by having the modulating function A(t)=sin($w_{scan}t$) and $w_1t=w_2t=\theta$ where θ is the angle of the scan line, and w/2π is the scanning frequency.

Another pattern which may be used for aiming, and which will be described in more detail later, is the rotating Lissajous pattern shown in FIG. 6. The rotating Lissajous pattern is somewhat inferior for aiming because its visibility is less pronounced than other patterns, but is particularly advantageous insofar as its ability to decode during aiming is the most robust of all the patterns considered.

Another pattern for aiming found particularly effective is a bright rosette pattern of diameter less than the diameter of rosette to be used for decoding.

Once satisfied with aiming, the scanner begins to deflect the light beam with a scan pattern appropriate for decoding the barcode. The scan pattern for decode may be the same as for aim, or may be a different pattern or may be the same or different pattern with center of rotation that shifts upon transition between the two modes or during decoding. In a preferred embodiment, the decode scan pattern which is generated depends upon whether the barcode is found to be a 1-D barcode (when the preferred decode pattern is omnidirectional) or a 2-D barcode (when the preferred decode pattern is raster). Pattern switching may be responsive to a second trigger pull, or may occur automatically.

Figure 4A:
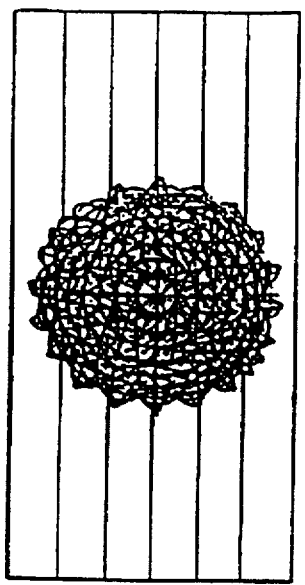
FIG. 4A shows a 2-D barcode, scanned by a relatively small, rotating Lissajous pattern for aiming.

For example, referring to FIG. 4A, it is assumed that a rotating Lissajous aiming pattern is directed toward a target having a 2-D barcode, as shown. The barcode is partially decoded to determine barcode type and orientation. The first row of the barcode may be decoded to determine whether the barcode is a 1-D or 2-D barcode. Alternatively, an algorithm may be used that is capable of determining whether the portion read is a portion of a 1-D or 2-D barcode on the basis of code words detected and decoded.

Figure 4B:
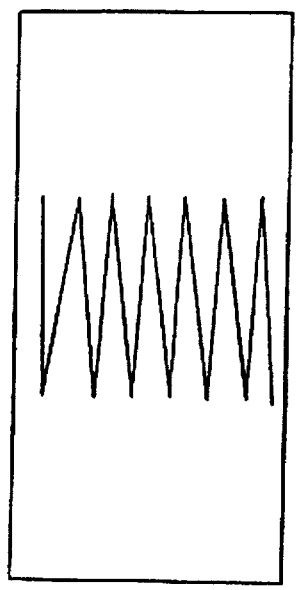
in FIG. 4B, the pattern has transitioned to a raster pattern suitable for 2-D barcode decoding; and in FIG. 4C, the raster is enlarged to decode the complete barcode.

Upon determining, in this example, that the barcode is a 2-D barcode, the scan pattern is changed to a raster pattern, as shown in FIG. 4B, necessary for scanning such barcodes. Based upon data read from the barcode during the aim mode, the width of the scanning pattern is opened until it at least spans the width of the barcode, and the height is incremented until the entire barcode is decoded. As the scanning pattern is increased in height, the barcode rows encompassed by the scanning pattern will be read, decoded and interpreted to determine whether an entire 2-D barcode symbol has been scanned, as described in U.S. Pat. No. 5,235,167. Each row the bar code will preferably be traversed by at least two scan lines, although only one traversal is necessary. Once the symbol is read, feedback to the user in the form of, for example, an audio tone, may be presented by the control/processing circuitry within the bar code reader.

Preferably, the specific pattern produced by the scanner, in accordance with an important aspect of the invention, is a pattern that is optimized for a particular classification of indicia and depending on whether the scanner is operating in a portable mode or is mounted in its fixture. A scan pattern is deemed to be optimized if it reads and decodes a prescribed pattern in a minimum amount of time, and within reasonable economic constraints.

If the scanner is operated in the fixed mode, the rotational orientation of the scan pattern with respect to barcode is indeterminate. On the other hand, if the scanner is operated in the aim and shoot mode, the scanning pattern may be manually aligned with the barcode. The specific pattern produced Should be optimized for decoding barcodes of the particular classification of barcode being read.

Figure 10:
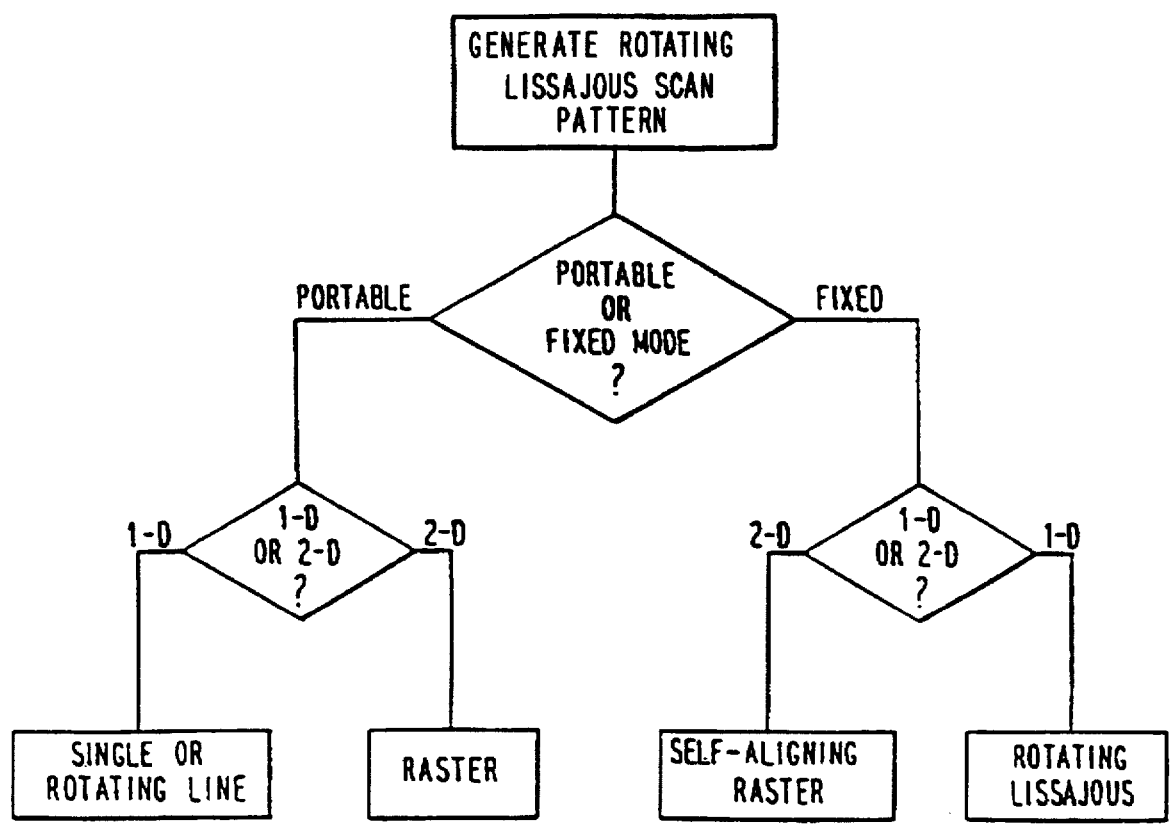
FIG. 10 is a chart for explaining the operation of the scanner in portable and fixed modes for 1-D and 2-D barcode patterns.

Hence, in accordance with a preferred embodiment of the invention, and referring to FIG. 10, a suitable scan pattern is produced for determining classification of the symbol to be read, e.g., whether the symbol is a 1-D or 2-D barcode. In the example shown, a rotating Lissajous scanning pattern is .selected for its omnidirectionality and robust decoding ability. At the same time, it is determined whether the scanner is in the portable mode or fixed mode of operation (the order of sequence of the first two steps is arbitrary). This may be carried out, for example, by means of a mechanical or magnetic proximity switch which is arranged to be actuated when the scanner is placed into a fixed holder in the fixed mode of operation.

Assume first that the scanner is in the fixed mode of operation and arranged to read a barcode symbol. The symbol is preliminarily read using the rotating Lissajous scan pattern to detect the start and stop codes of the barcode, so as to determine whether it is a 1-D or 2-D barcode. If the symbol being scanned is determined to be a 1-D barcode, the scanning pattern will remain defaulted in the form of a rotating Lissajous pattern, as shown in FIG. 10, a pattern that has been determined in accordance with the invention to be optimized for 1-D barcodes. If the symbol is determined to be a 2-D barcode, on the other hand, the scanning pattern is changed to a self-aligning raster, as also shown in FIG. 10. (A self-aligning raster is a raster that rotates or precesses so as to traverse a 2-D barcode and read it independently of the rotational orientation of the barcode. A specific embodiment of self-aligning raster is a precessing raster described in more detail later with reference to FIG. 7.)

Still referring to FIG. 10, when the scanner is determined to be operating in the portable mode, and the symbol is read during Lissajous scanning is determined to be a 2-D barcode, the scanner produces a raster type scanning pattern. This raster is preferably stationary, but may be enhanced to precess or rotate so as to read barcode symbols of diverse rotational orientations. On the other hand, if the symbol is determined to be a 1-D barcode symbol, scanning is continued in the form of a pattern optimized to read such barcodes, such as a single or rotating scan line, or rotating Lissajous.

The particular scanning patterns produced for decoding 1-D or 2-D barcodes when the scanner is operated in portable and fixed modes can be varied for specific applications and modules of particular optical characteristics. What is important is that the scanner is adaptive, controlled manually but preferably automatically, to produce decoding scan patterns that are optimized, that is, as robust as practical with respect to the operating mode selected and the classification of indicia being read.

Preferably, the scan pattern is also optimized in dependency on whether scanning is carried out by a presentation type (under a scan lamp) or a pass through (supermarket) type reader. In the presentation type reader, an article carrying a barcode or other symbol to be read is brought to the reader or the reader is brought to the article. Since reading is carried out in very close proximity to the barcode, there is no need for aiming. In the pass through reader, the article bearing a barcode is swiped past a scanning pattern produced by a fixed source of light beams. These two modalities present different decoding requirements to barcode readers (in the pass through mode of reading, the article swipes through the scan region relatively quickly, whereas in the presentation mode, the barcode is relatively stationary when read). Hence, if reading is carried out in the pass through mode, and the barcode is not very truncated (that is, the barcode is thin), a scanning pattern producing lines that are more sparsely spaced but more often repeated is preferred because it is more likely to traverse the barcode. That is, the faster the swipe, the thicker the barcode should be and hence a scanning pattern, such as a rotating Lissajous pattern, optimized for a relatively thick barcode pattern is preferred.

Figure 4C:
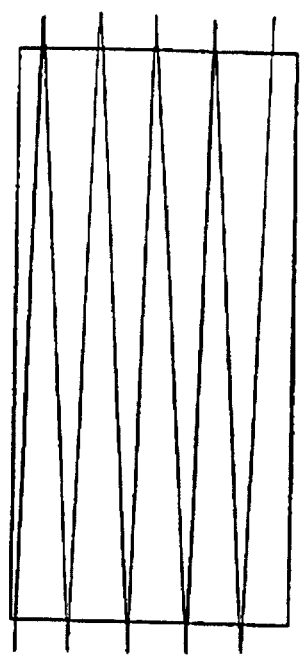

Assume now that the rotating Lissajous pattern is generated (FIG. 4A) for aiming, in aim and shoot scanning. The rate of increase of the size of the raster in moving from FIG. 4B to FIG. 4C is responsively controlled depending upon the size and nature of the barcode. The rate at which the scan pattern opens may be controlled to be faster for larger barcodes. The size of each increment may be dependent upon the working range of the scanner. For example, very long range scanners, e.g., up to about 60 feet, may require smaller increments so that the patterns do not grow too fast at the end of the working range.

The preferred Lissajous pattern for decoding, shown in FIG. 6, is preferably of frequency ratio x/y ranging from 1.1 and 1.3 and rotated at a rate of between 1 to 4 degrees per scan. These numbers are found optimal for scanning highly truncated 1-D barcodes. In this respect, the rotating Lissajous pattern, with its sequence of scanning patterns that are successively rationally offset, has been found more robust for decoding than a stationary Lissajous pattern. The optimal Stationary Lissajous pattern is at a frequency ratio 0.7. However, the optimized rotating Lissajous pattern produces a 17% improvement in decoding efficiency over the stationary Lissajous pattern. When the rotating Lissajous pattern is converted to a raster for scanning 2-D barcodes in omnidirection, the frequency ratio is made higher by increasing the slower scan frequency y.

Figure 9A:
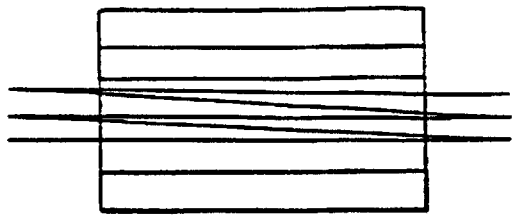
FIG. 9A depicts a raster pattern scanning a 2-D barcode.
Figure 9D:
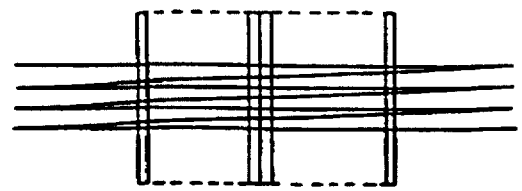
FIGS. 9D–9F present the same scan patterns to a 1-D barcode.
Figure 9B:
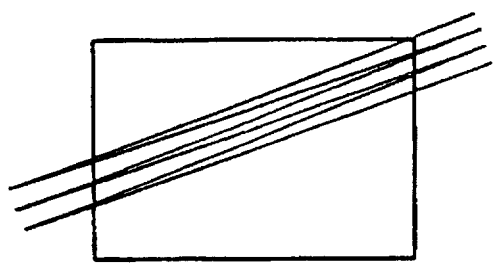
in FIG. 9B, the scan pattern is horizontally misoriented with respect to the barcode; and in FIG. 9C, the scan pattern contains a degree of droop.
Figure 9E:
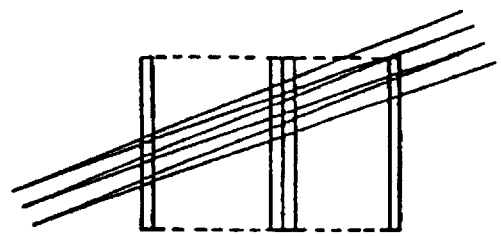
Figure 9C:
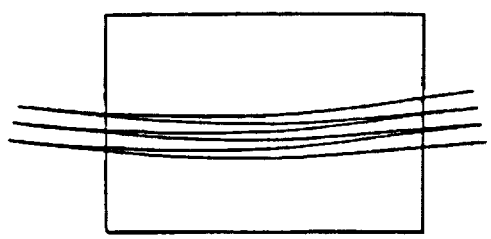
Figure 9F:
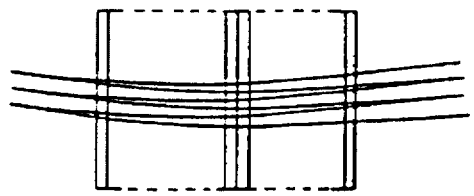

FIGS. 9A–9D are raster patterns scanning 2-D and 1-D barcodes, respectively, in perfect alignment. However, in-practice since the orientation of the scan pattern will not be in perfect alignment with the barcode; scanning typically will be somewhat skewed as shown in FIGS. 9B and 9E. Furthermore, since 2-D scanning mechanisms tend to be slightly non-linear and will ordinarily produce a somewhat arcuate, or drooped, scan pattern as shown in FIGS. 9C and 9F, decoding of the barcode is somewhat difficult to achieve when a complete row of barcode is not entirely scanned.

Figure 7:
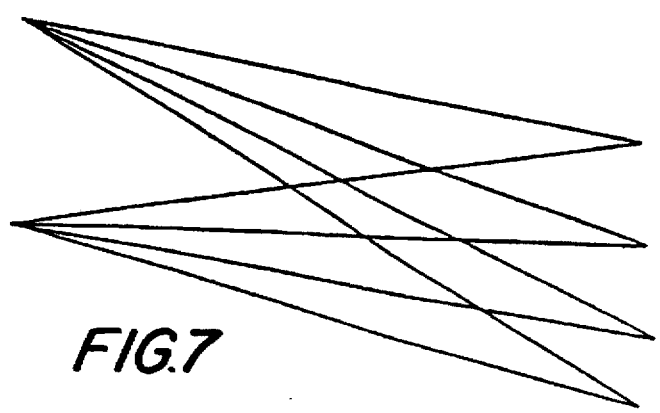
FIG. 7 shows a precessing raster scan pattern for decoding 2-D barcodes of various orientations.

To compensate for rotational misalignment between the scan pattern and barcode, or droop in the scan pattern, the raster is precessed so as to traverse barcode elements that are angularly displaced or are not oriented along a straight line. Referring to FIG. 7, the angle of sweep of each line by the raster scanner is staggered or precessed slightly, so that the light beam sweeps across the barcodes in a zig-zag pattern. Precession whereby subsequent scanning patterns are rotationally offset from a previous pattern, occurs when the ratio of the X component to the Y component of the scanning pattern is not an integer. In the preferred embodiment, the scan ratio is 1.75:1. For example, if the X component frequency is 120 scans per second, then the Y component frequency is 68.5 scans per second (120 divided by 1.75). The scanner can be designed such that the scan ratio is always 1.75:1, although precession alternatively can be achieved by activating the Y frequency scan by a computer driver. Preferably, each row of the bar code will be traversed by two lines of scan, although only a single scan line per row is necessary.

The resultant zig-zag pattern causes the light beam to sweep the barcode symbols in a plurality of different angles, so that angularly offset lines of barcode up to about thirty degrees of offset can be read by the raster during precession. Similarly, even if the beam emitted by the scanner contains a degree of droop, the precessing raster will scan every barcode line during successive frames.

Reference should now be made to FIGS. 11A–11E, 12, 12A–12H, 13A–13D and 14A–14H which illustrate preferred scanner housings and point-of-sale units. It is preferred (although it is not essential) for the embodiments shown in FIGS. 11A–11E, 12, 12A–12H, 13A–13D and 14A–14H to incorporate at least some of the features which have already been described.

FIGS. 11A to 11E show a portable scanner which can be used either in hand-held mode or in a fixed mode. The scanner comprises a scanner body 60 of substantially conventional "gun" shape, having a manually graspable handle portion 62 and a head portion 64. Pivotally mounted to the end of the handle portion 62, at pivot 66, is an adjustable base portion generally indicated at 68. The base portion, which is preferably of a molded plastics material, comprises a lower support section 70, a cranked central support section 72, and a further cranked upper section 74.

The handle position 62 typically includes a trigger switch 62' which in an embodiment according to the present invention extends along a major portion of one edge of the handle 62, thereby allowing four fingers of the user to grip the trigger and activate it by a squeezing motion. Such an extended trigger embodiment may also be implemented in a conventional gun shaped scanner as well, i.e., one not including the base portion indicated at 68. Indentations for each of the four fingers of the user may be molded into the trigger switch 62' so as to allow a more comfortable gripping action.

Figure 11A:
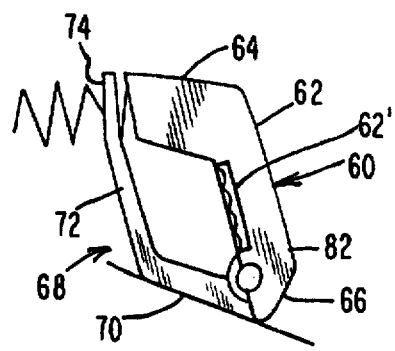
FIGS. 11A to 11E are various perspective views of an ergonomic scanner according to a first embodiment of the present invention.
Figure 11B:
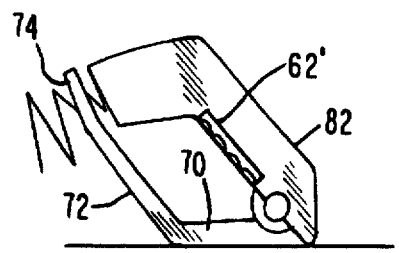
Figure 11C:
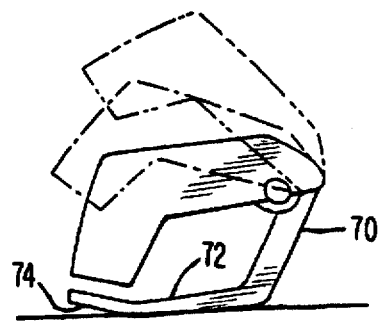

The shape of the base 68 allows the scanner to be supported in a variety of positions. For example, in FIG. 11A it will be seen that the scanner rests upon an inclined surface on the lower section 70 of the base. FIG. 11B is similar, except that the support surface is now horizontal. The length of the lower section of the base is sufficiently long that the center of gravity of the scanner remains within the section over quite a wide range of orientations. As may be seen in FIG. 11C, the scanner may also be stood on the central section 72 of the base, with the head then pointing downwardly. In that position, the scanner body may be pivoted with respect to the base, so as to position the scanner head in the desired orientation. The length of the central section 72 is sufficiently long that the center of gravity of the scanner remains within the section over a wide range of orientations of the supporting surface, and also over a wide range of pivotal positions of the scanner with respect to the base.

Figure 11D:
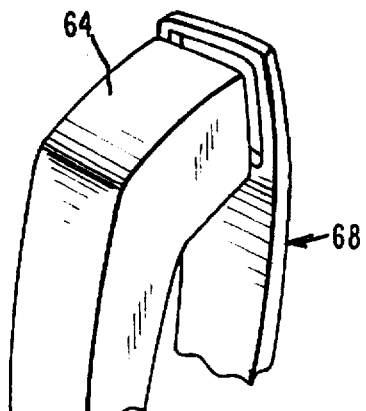
Figure 11E:
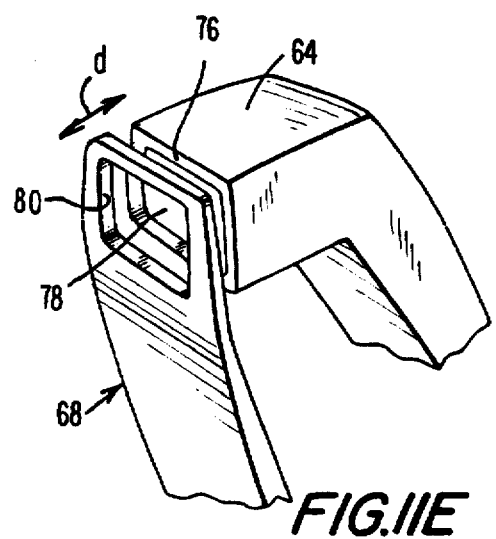

As may best be seen in FIGS. 11D and 11E the upper section 74 of the base is located, in a folded position of the base, directly in front of a window 78 in the front 76 of the scanner head. An unglazed open window 80 is provided in the upper section 74 to allow unimpeded transmission of the scanning beam and the reflection from the indicia (not shown) which is being scanned. Preferably a stop such as is illustrated schematically at 82 is provided which prevents the base from being folded in towards the scanner body any further than is shown in FIGS. 11D and 11E. In that position, there is a defined gap d between the front 76 of the scanner head and the front of the open window 80. The distance d defines an appropriate distance for easy scanning, so that, if a user wishes, he can hold the body portion 62 of the scanner in his hand, and bring the indicia to be scanned right up close until it is adjacent the window 80. Such a spacing also means that when the unit is used in the fixed position shown in FIG. 11C, the spacing of the scanner head from the indicia (which is on the underlying support surface) is very close to being optimal.

If the user wishes to use the scanner in hand-held mode, and finds the adjustable base an inconvenience, he may simply swing it out of the way.

An alternative embodiment is shown in FIGS. 12A to 12E, where once again the scanner may be either held in the user's hand or simply positioned on the work surface and used from there. The scanner comprises a relatively thin, generally rectangular curved head portion having a forwardly directed window 99. Behind the head portion, on the concave side, is mounted a generally cylindrical handle portion 88. In a portable "point and shoot" mode, shown in FIGS. 12C and 12D, a user simply grasps the handle 88 and points the head 90 in the direction of the indicia (not shown) to be scanned.

Figure 12:
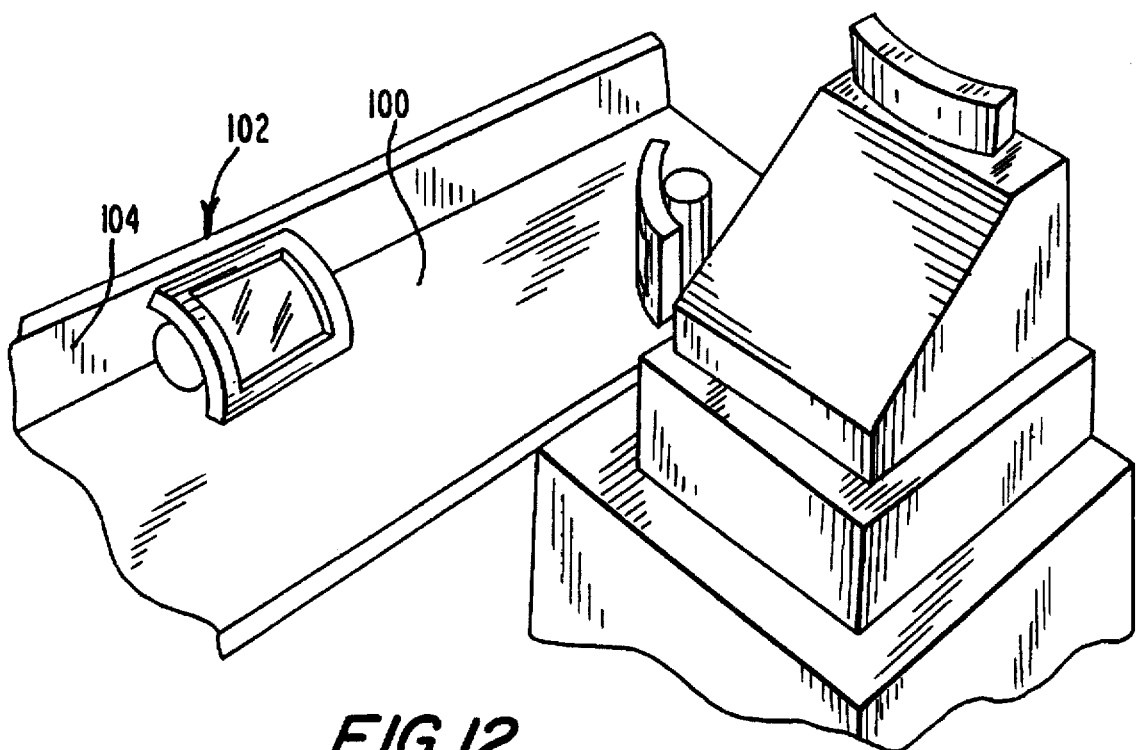
FIGS. 12A to 12E show a portable scanner, according to a further embodiment, further illustrating its mode of use.
FIGS. 12F and 12G show two variations on the embodiment shown in FIGS. 12A to 12E.
FIG. 12H shows a variation of the above embodiment in which the head of the scanner can be removed from the handle.
Figure 12A:
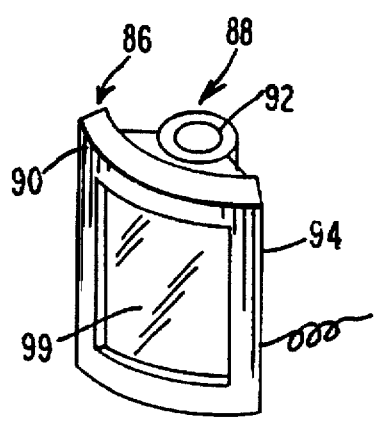

The scanner may also be used in a "hands-free" mode, simply by placing it onto a work surface such as a supermarket checkout work surface 100 shown in FIG. 12. In one mode of operation, the unit may be stood perpendicularly on the work surface, as is shown in FIG. 12A. Here, the unit stands on a flat end surface 90 of the head 86, and on a flat end surface 92 of the handle 88. To provide stability, the end surfaces 90, 92 lie in one plane. (For ease of illustration, the end surfaces 90, 92 are shown uppermost in FIG. 12A, but it will of course be understood that there are identical surfaces at the other end of the head and the handle). In this position, the scanning beam exits the window 99 substantially horizontally.

Figure 12B:
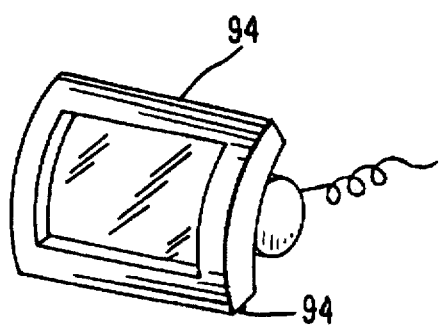
Figure 12D:
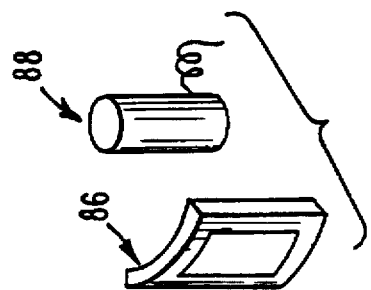
Figure 12C:
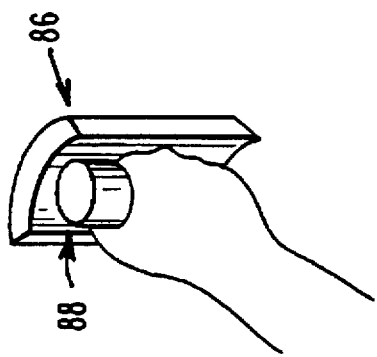
Figure 12G:
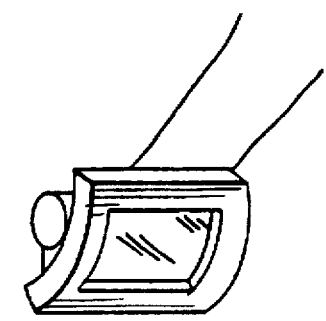

Another "hands-free" mode is shown in FIG. 12B. Here, the scanner is positioned on the work surface so that it rests on one of the edges 94 of the head, and also on the length of the handle 88. In this position, the scanning beam is angled upwards.

A further position is illustrated generally at 102 in FIG. 12. Here, the scanner rests with one edge 94 of the head on the work surface 100, and the other edge against an angled edge 104 of the work surface.

In a variation of this embodiment, a base unit 106 (FIG. 12F) may be provided. This is pivotally secured to the handle 88 and enables the head to be supported in a number of different orientations on a work surface. Another base 108, of an alternative cranked shape, is shown in FIG. 12E.

Figure 12H:
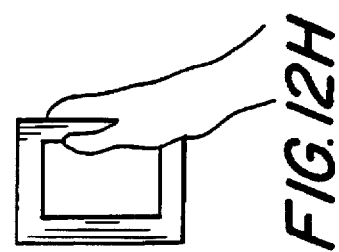
Figure 12F:
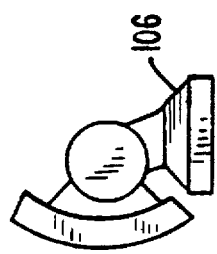
Figure 12E:
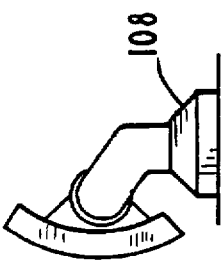

FIG. 12H shows an arrangement in which the head 86 may be removed from the handle 88. The head may then be fixed onto another handle (not shown) of another shape, or it may be mounted to a docking station (also not shown) of a fixed scanning unit such as a point-of-sale unit. Alternatively, the handle 88 could be replaced by (instead of being used with) an appropriate base such as the bases 106, 108 shown in FIGS. 12E and 12G.

A further arrangement, this time embodying a point-of-sale unit 110, is shown in FIG. 13A–13D. The point-of-sale unit 110 comprises a base unit 112 having a body portion 114 with a generally flat underside (not shown) for location on a checkout surface 116, and a curved upper surface 118 which includes a large central window 120. The body 114 incorporates a downwardly extending flange 122 at one end thereof, to assist positioning of the unit correctly on the work surface.

A barcode scanner 124 is removably located within the body 114 via an aperture 128 at one end. The scanner 124 incorporates a window 130 and keys 132 for control/input.

When the scanner 124 is to be used in connection with the point-of-sale unit, it is inserted into the body 114, where is may be controlled by keys 134 (FIG. 13B) on the upper surface of the body. However, it is often difficult to scan heavy or bulky items from a fixed position, and for such items the checkout operator may simply remove the scanner 124 and use the scanner in hand-held mode. When the large or heavy item has been scanned, the scanner would then be reinserted into the aperture 128. Electrical contacts (not shown) on the scanner will link with the base unit when the scanner is inserted, thereby automatically transmitting any information about remotely scanned articles to the central computer.

Figure 13A:
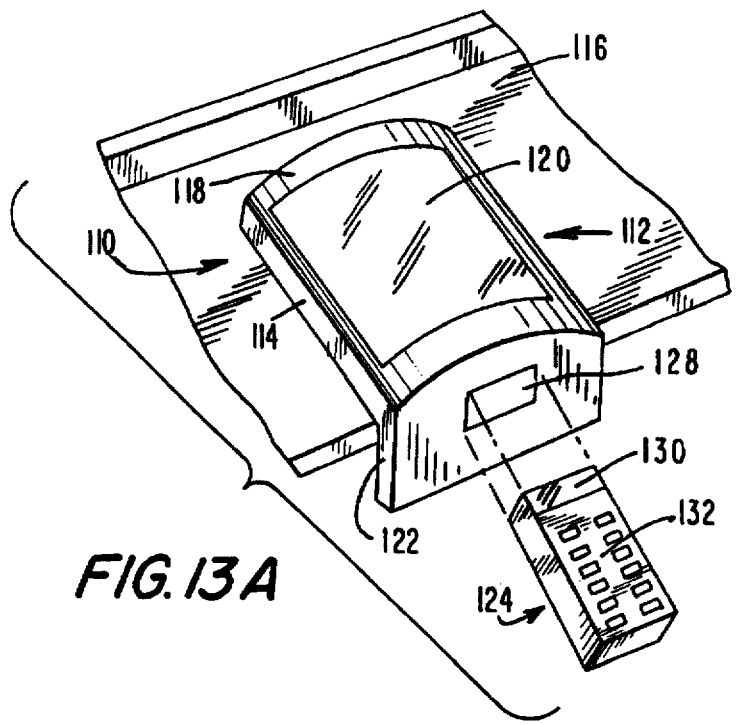
FIGS. 13A and 13B show a point-of-sale scanner assembly according to yet a further embodiment, incorporating a removable scanner.
Figure 13B:
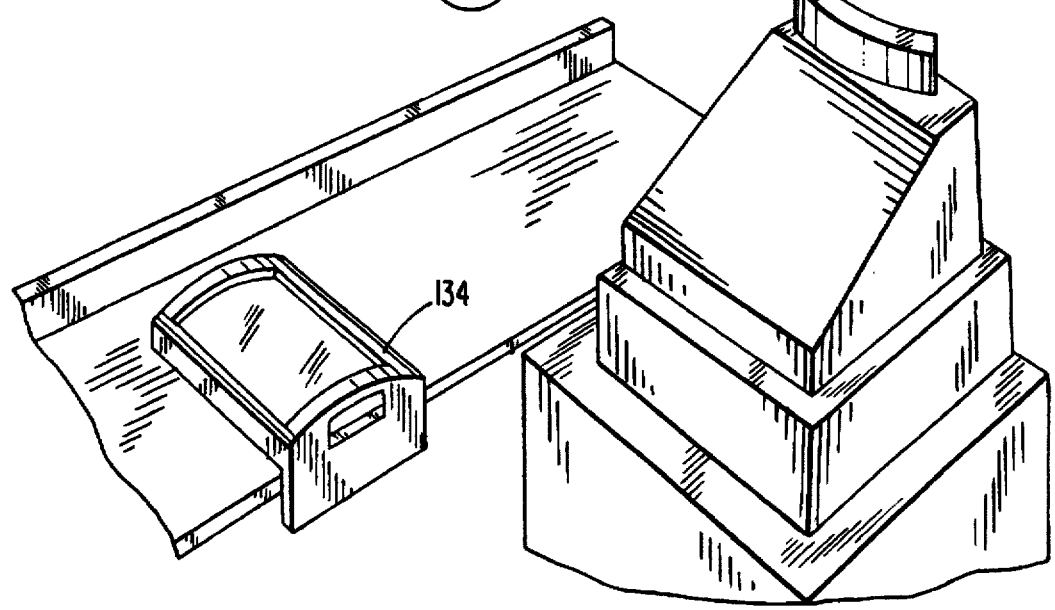
Figure 13C:
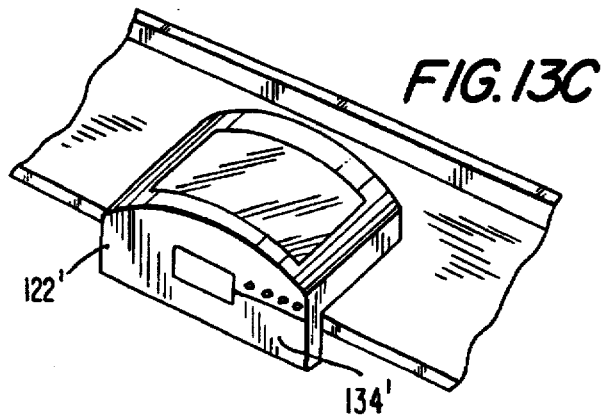
FIGS. 13C and 13D show two alternatives to the scanner assembly of FIGS. 13A and 13B.
Figure 13D:
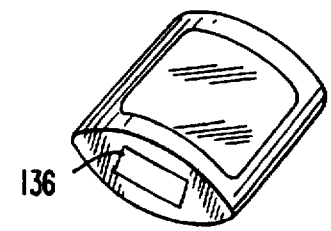

In a variation of the embodiment, shown in FIG. 13C, the keys 134' to control the unit may be positioned on the end of the body, or on the flange 122' rather than (or in addition to) on the top. Yet a further variation is shown in FIG. 13D, which illustrates the addition of an LCD display 136 for the customer. The display is preferably on the end of the body away from the flange 122, but it could instead be on the top or in any other position where it would be easily visible to the customer.

FIGS. 14A–14D show yet a further embodiment of the point-of-sale unit. Here, a removable scanner 150 is arranged to be received within a recess 152 of a scanner support 154. The scanner support 154 is held in cantilever fashion from a vertical post 156 which itself supported from or which forms part of a checkout counter 158. Manually adjustable nuts 160 are provided to enable the user to slide the support 154 up and down the post 156 and then to lock it in an appropriate position. Likewise, the user may adjust the angular position of the support 154 with respect to the post. The distal end of the support 154 has a window 162 through which the scanning beam passes, to impinge upon a barcode 164 on an item 166 which is being purchased.

On the upper end of the post 156 is a check writing counter 168, comprising a generally horizontal counter portion 170 and an angled portion 172. As may be seen in FIG. 14D the angled portion 172 may incorporate a slot 174 within which may be positioned an LCD unit 176. This may provide the shopper with information on the individual item that is currently being scanned and/or the total cumulative price so far. As an alternative to the LCD unit 176, other units could be provided for positioning within the slot 174. One possibility, for example, would a point-of-sale advertisement unit 178: this could either be a panel which simply displays a fixed advertisement, or alternatively it could comprise an electronic unit which displays variable advertisements according to the item being scanned, previous items that have been scanned, or the known preferences of the particular shopper.

If the shopper wishes to purchase a heavy or a bulky item which cannot be conveniently placed on the counter surface 180, the shop assistant simply removes the scanner 150 from the support and uses it in "hand-held" mode. When the scanner is replaced into the support, it is arranged to report automatically on the item or items that have been scanned in "hand-held" mode.

Figure 14A:
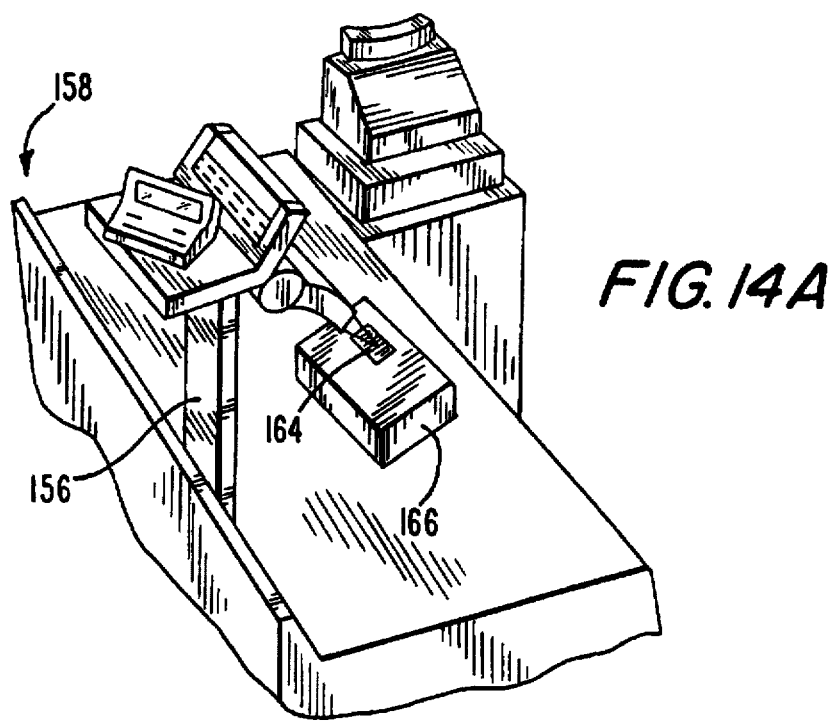
FIGS. 14A to 14D show a point-of-sale unit, according to a final embodiment, incorporating a check writing counter and a removable bar code scanner.
Figure 14B:
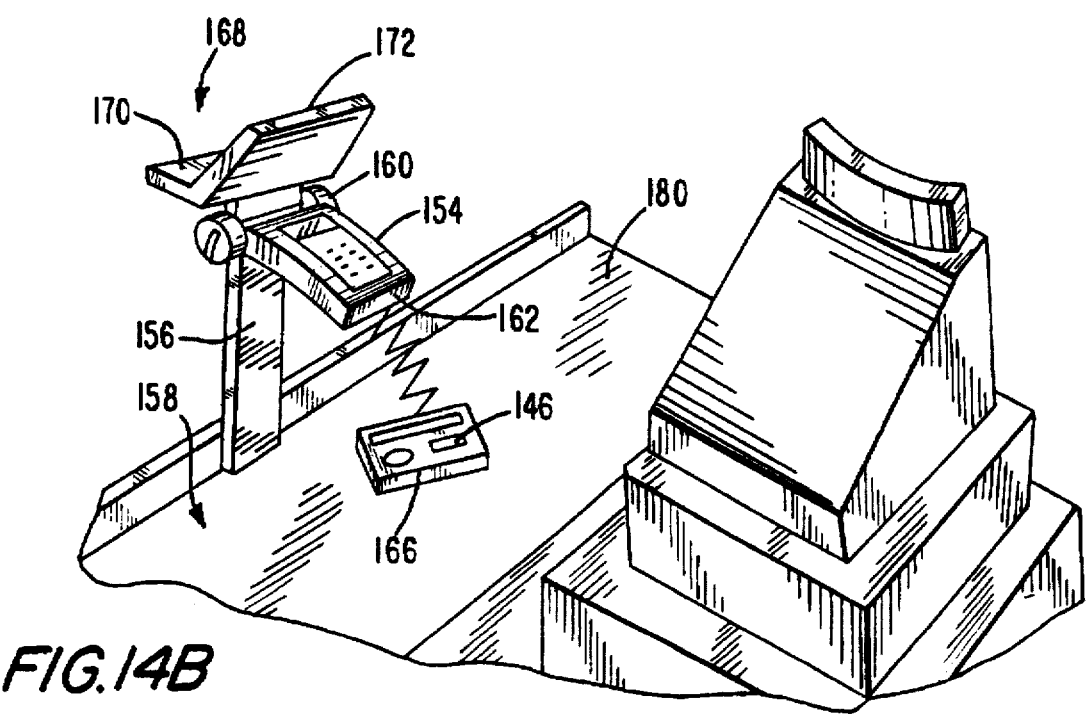
Figure 14C:
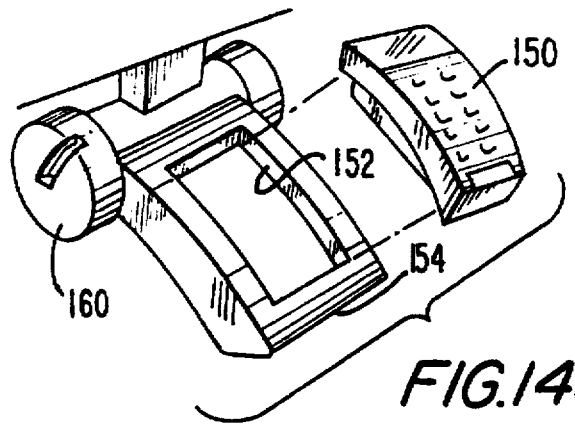
Figure 14D:
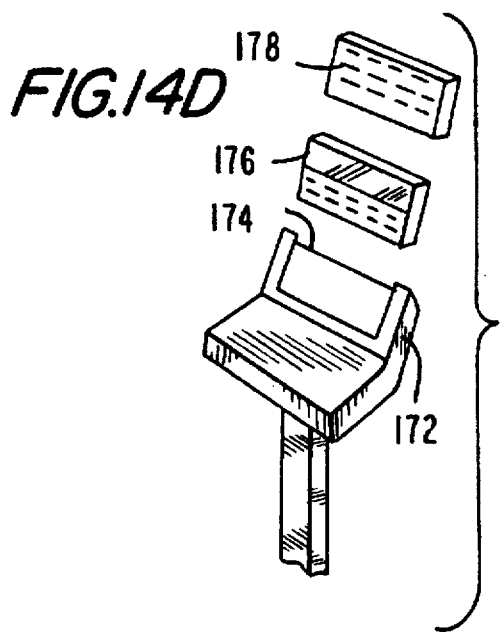
Figure 14E:
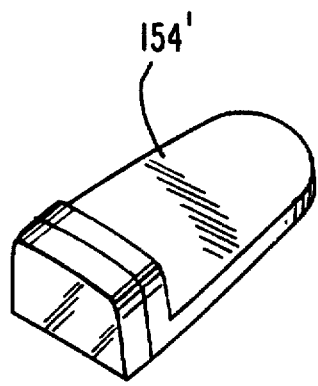
FIG. 14E shows an alternative base portion for the point-of-sale unit illustrated in FIGS. 14A to 14D.
Figure 14F:
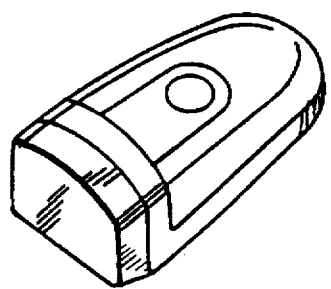
FIGS. 14F to 14H illustrate different removable scanners for use with the base of FIG. 14E.
Figure 14G:
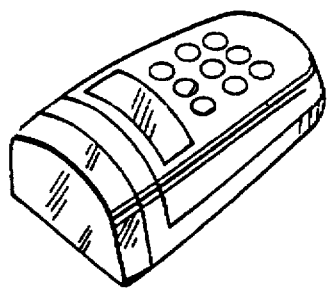
Figure 14H:
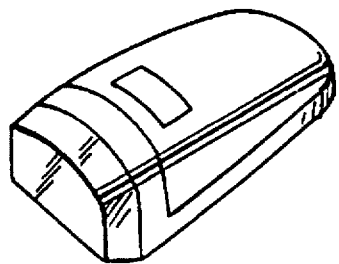

A variant embodiment of the support unit 154 is shown in FIG. 14E, and labelled 154'. For use with this support or base, the point-of-sale supplier may provide either a standard scanner, as shown in FIG. 14F, or a terminal scanner (incorporating a keyboard) as shown in FIG. 14G, or a radio scanner (incorporating a means for wireless communication) as shown in FIG. 14H.

It will be appreciated that it is possible to combine compatible features of the embodiments of FIGS. 11A–11E, 12, 12A–12H, 13A–13D and 14A–14H. Such compatible combinations are hereby stated to be specifically contemplated, and are intended where appropriate to be within the scope of the corresponding claims.

Hence, as described herein, the preferred embodiment produces a rotating Lissajous scan pattern or other pattern that is easily seen by the user during aiming on a barcode, and then under manual control or automatically converts to a decode scan that is robust and opens at a rate, and to a size, that depends upon the barcode itself. If the barcode is a 1-D code, the decode pattern may be a precessing raster that is able to scan rows that are rotationally misaligned with the scan lines. Scanning is implemented by novel miniature 1-D and 2-D scanning assemblies, as described herein.

Another form of scanner that can produce the required two-dimensional scanning patterns is of a type implementing a scan element supported by a holder structure mounted on a Mylar motor to produce oscillatory movements, the arrangement being mounted on a printed circuit board within a housing that can be manually held. The scanning motor and arrangement may be made of components formed essentially of molded plastic material, and utilizing of a Mylar leaf spring to limit scan. See, for example, application Ser. No. 07/812,923, filed Dec. 24, 1991, assigned to the assignee of this invention and incorporated herein by reference.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

We claim:

1. A point-of-sale unit, comprising:

a fixed base unit;

an optical scanner for reading indicia with a scan pattern, the scanner being arranged in a first mode for attachment to the base unit for hands-free operation, and in a second mode for removal from the base unit for portable operation unattached to the base unit;

means for detecting which of the modes the scanner is in; and means for changing the scan pattern to an optimized pattern for the detected mode.

2. The point-of-sale unit as claimed in claim 1; wherein the base unit includes a generally flat body having a lower surface for positioning onto a work surface, and an upper surface having a window therein, the scanner being arranged in use to be positioned beneath the window.

3. The point-of-sale unit as claimed in claim 2, wherein the base unit has an end surface with an aperture therein through which the scanner is inserted and removed.

4. The point-of-sale unit as claimed in claim 2, wherein the upper surface is curved in one plane only.

5. The point-of-sale unit as claimed in claim 1, wherein the base unit includes a vertical flange for positioning the base unit with respect to an edge of a work surface.

6. The point-of-sale unit as claimed in claim 1, wherein the base trait includes key means for control of the scanner when operating in the first mode.

7. The point-of-sale unit as claimed in claim 1, wherein the base unit includes display means.

8. The point-of-sale unit as claimed in claim 1, wherein the fixed base unit includes an elongated support post to which is secured a scanner support, the scanner being held by the scanner support during the first mode of operation.

9. The point-of-sale unit as claimed in claim 8, wherein the scanner support is cantilevered from the support post.

10. The point-of-sale unit as claimed in claim 8, wherein the scanner support is adjustable in position lengthwise along the support post.

11. The point-of-sale unit as claimed in claim 8, wherein the scanner support is adjustable in angle with respect to the support post.

12. The point-of-sale unit as claimed in claim 8, including a check writing counter.

13. The point-of-sale unit as claimed in claim 12, wherein the check writing counter is at the top of the support post.

14. The point-of-sale unit as claimed in claim 1, including a check writing counter.

15. The point-of-sale unit as claimed in claim 14, wherein the check writing counter includes a check writing surface and customer display means.

16. The point-of-sale unit as claimed in claim 15, wherein the customer display means includes a point-of-sale advertisement.

17. The point-of-sale unit as claimed in claim 15, wherein the customer display means includes a display support having a mounting thereon for receipt of one of a plurality of selectable customer display panels.

18. The point-of-sale unit as claimed in claim 14, wherein the customer display means includes a display which displays details of the current transaction.

19. The point-of-sale unit as claimed in claim 1, wherein the scanner includes a keypad for use in the second mode of operation.

20. The point-of-sale unit as claimed in claim 1, wherein the scanner includes a transmitter/responder for wireless communication with a central control station in the second mode of operation.

21. The point-of-sale unit as claimed in claim 1, wherein said scanner is responsive to said detecting means for controlling a light beam to traverse the indicia with a scan pattern optimized for the detected mode.

22. The point-of-sale unit as claimed in claim 21, wherein the scanner is further responsive to information content of said indicia being read for controlling the light beam to traverse the indicia with a scan pattern also optimized for reading the indicia.

23. The point-of-sale scanner as claimed in claim 22, wherein the scanner produces a self-aligning raster pattern when the scanner is operating in the first mode and the indicia comprise a two-dimensional barcode.

24. The point-of-sale scanner as claimed in claim 23, wherein the scanner produces an omnidirectional pattern when the scanner is operating in the second mode and the indicia comprise a one-dimensional barcode.

25. The point-of-sale unit as claimed in claim 23, wherein the scanner produces a stationary raster pattern when the scanner is operating in the second mode and the indicia comprise a two-dimensional barcode.

26. The point-of-sale scanner as claimed in claim 22, wherein the scanner produces a Lissajous raster pattern when the scanner is operating in the first mode and the indicia comprise a one-dimensional barcode.

27. The point-of-sale scanner as claimed in claim 22, wherein the scanner produces a single line pattern when the scanner is operating in the second mode and the indicia comprise a one-dimensional barcode.

28. A scanner for electro-optically reading indicia with a scan pattern of light in a hand-held portable mode of operation, or in a fixed mode of operation in which the scanner is mounted on a stationary support, comprising:

means for detecting which of the modes the scanner is in; and means for changing the scan pattern to an optimized pattern for the detected mode.

29. The scanner as claimed in claim 28, and further comprising means for distinguishing among types of indicia after the detected mode has been determined; and wherein the changing means selects the optimized pattern based on the detected mode and on the indicia type determined by the distinguishing means.

30. The scanner as claimed in claim 29, wherein the types of indicia are one-dimensional and two-dimensional barcode symbols.

31. The scanner as claimed in claim 30, wherein the scanner produces a self-aligning raster pattern when the scanner is operating in the fixed mode and the indicia is a two-dimensional symbol.

32. The scanner as claimed in claim 31, wherein the scanner produces a stationary raster pattern when the scanner is operating in the portable mode and the indicia is a two-dimensional symbol.

33. The scanner as claimed in claim 30, wherein the scanner produces a Lissajous raster pattern when the scanner is operating in the fixed mode and the indicia is a one-dimensional symbol.

34. The scanner as claimed in claim 30, wherein the scanner produces a single line pattern when the scanner is operating in the portable mode and the indicia is a one-dimensional symbol.

35. The scanner as claimed in claim 34, wherein the scanner produces an omnidirectional pattern when the scanner is operating in the portable mode and the indicia is a one-dimensional symbol.

* * * * *